Sept. 13, 1932.  M. WAGNER  1,877,736
CHANGE SPEED GEARING
Filed March 27, 1930
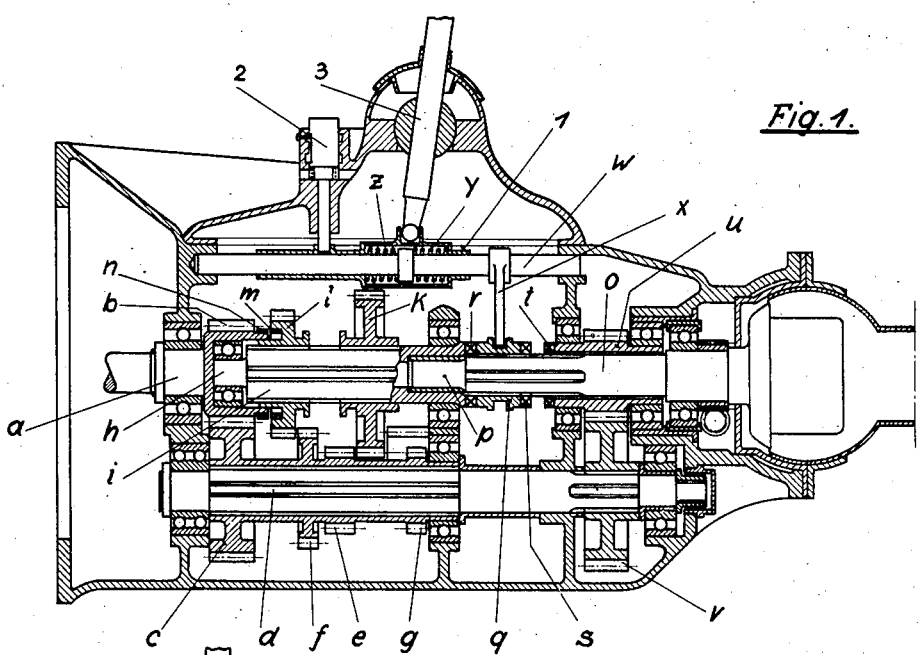
Fig. 1.
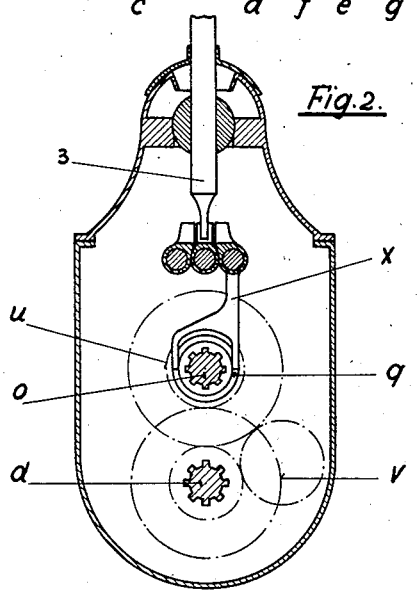
Fig. 2.
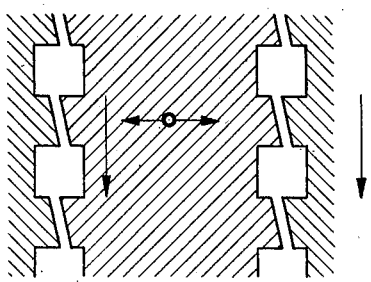
Fig. 8.
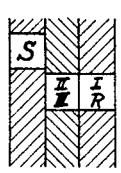 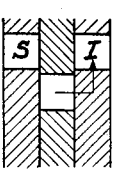 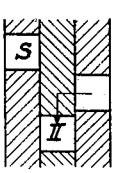 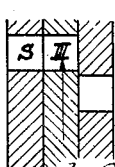 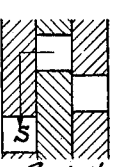
Fig. 3.  Fig. 4.  Fig. 5.  Fig. 6.  Fig. 7.
Inventor
Max Wagner
by Emons, Booth, Varney Townsend Att'ys.

Patented Sept. 13, 1932

1,877,736

UNITED STATES PATENT OFFICE

MAX WAGNER, OF STUTTGART, GERMANY, ASSIGNOR TO DAIMLER-BENZ AKTIENGE-
SELLSCHAFT OF STUTTGART-UNTERTURKHEIM, GERMANY, A COMPANY OF GER-
MANY

CHANGE SPEED GEARING

Application filed March 27, 1930, Serial No. 439,315, and in Germany March 30, 1929.

The invention refers to a chain speed gearing particularly adapted to provide a super speed drive for automobiles.

The super speed arrangement is employed on cars which under special road circumstances must develop a very great driving speed when the motor runs with a relatively low number of revolutions per minute.

The effect obtained with a super speed arrangement consists therein that the motor is not exposed to the detrimental influence of an exceedingly high number of revolutions per minute, that the car keeps its suppleness of performance in the direct drive and that the economy is increased.

In the preferred embodiment of the invention the main shaft of the change speed gear is divided into several parts with which co-operates a single countershaft which is utilized both for the customary lower speeds and for the super speed, in both cases taking its motion from the driving shaft or clutch shaft through the same pair of gears. The mechanism forms a unit installed in a single gear box.

The gear set according to the invention can for instance be constructed in such a way, that for the engagement of the direct drive and for the engagement of the super speed gear a shiftable coupling clutch of known construction is employed which can be shifted in operative coupling position into that part of the main shaft, which is separated from the other part of said shaft, or which the shiftable coupling clutch is arranged, and that said coupling clutch can be shifted in operative coupling position into the driving pinion of the super speed gear, which pinion is arranged on the same part of the main shaft on which the shiftable coupling clutch is arranged. The separate part of the main shaft serves as driving shaft.

The device is preferably constructed in such a way that the super speed gear can be brought into action only after the parts are in the direct drive position.

The device for engaging the super speed gear may be provided with an arrangement according to which the coupling clutch of known construction is spring operated in such a way that when said coupling clutch is moved past its intermediate position it is automatically shifted in one or the other of its operative end positions.

For the engagement of the different gears however, all sorts of gear shift arrangements may be employed.

The effect obtained with the change speed gear and the super speed gear of the invention in view of the constructions generally employed up to now, consists chiefly in the simplicity of the construction and consequently in the low cost of manufacture.

In the drawing a form of execution of the device according to the invention is illustrated.

Fig. 1 is a longitudinal section through the change speed gear and super speed gear set of the invention.

Fig. 2 is a cross section.

Figs. 3–7 show the different relative positions of the shifting rods which they occupy for the engagement of the different gears, and Fig. 8 is a diagram showing the construction of a clutch and its cooperating parts.

On the clutch shaft or driving shaft of the gear as a whole ($a$) the pinion ($b$) is mounted in the well known manner. This pinion ($b$) meshes with the pinion ($c$) of the counter shaft ($d$) on which the pinions ($e$) of the first gear ($f$) of the second gear and ($g$) of the reverse gear are mounted. The main shaft ($i$) is journaled in the well known manner inside the end of the clutch shaft ($a$) by means of the tenon ($h$). On the main shaft ($a$) the gear wheels ($k$) of the first gear and ($l$) of the second gear are shiftably arranged gear wheel ($l$) is provided with clutches ($m$), which cooperate with clutches ($n$) of pinion ($b$) in order to connect the main shaft ($i$) with the clutch shaft ($a$) for the direct drive. In the main shaft ($i$) another shaft ($o$) is journaled by means of the tenon ($p$). The shaft ($o$) is the wheel driving shaft or driven shaft of the gear as a whole and serves for transmitting the driving torque to the wheels. On this shaft the shiftable coupling clutch provided with beveled coupling teeth ($r$) and ($s$) is mounted.

The shiftable coupling clutch (q) is connected with the main shaft (i) when the first, second and third gear (direct drive) are engaged.

In order to engage the super speed gear the shiftable coupling clutch (q) is disengaged from the main shaft (i) and is brought in operative coupling position with the gear wheel (u) by means of the teeth (t). The driving torque is then transmitted from the clutch shaft (a) by means of the pinions (b) and (c) to the countershaft (d) and further by means of the gear wheel (v) fixed on the countershaft, to the pinion (u) on the shaft (o).

From this pinion (u) the driving torque is transmitted to the driven shaft (o) by means of the shiftable coupling clutch (q), shiftably mounted on said driven shaft.

The coupling teeth of the shiftable coupling clutch (q) are beveled, in order to enable the cooperating coupling teeth of the element (q) and of the pinion (u) and the main shaft (i) to pass alongside of each other as long as their respective rotational speeds are not the same. (See Fig. 8).

As soon as the respective rotational speeds become equal, the projecting coupling teeth enter into the corresponding recesses and the coupling is effected.

The gear shifting device for the super speed gear can consist for instance in a shifting rod (w), which is connected to the shiftable coupling clutch (q) by means of a forked arm (x). The shifting rod (w) is surrounded by a bushing (1), which is connected to the shifting rod by means of springs (y) and (z). As illustrated at (2), a key-controlled locking device of the customary construction is provided which may be utilized for locking bushing (1) in the position shown in Fig. 1 with the change speed gear in the neutral position, thus preventing unauthorized operation of the same until the bolt of the locking device is retracted to free the bushing. A gear shift lever (3) is connected with the spring controlled bushing (1).

The locking device (2) keeps the shiftable coupling clutch in operative coupling position with the main shaft (i) when the motor runs idle (Fig. 3), when the first gear is engaged (Fig. 4), when the second gear is engaged (Fig. 5) and when the third gear is engaged (direct drive Fig. 6). When the super speed gear is to be brought in operative condition the gear shift lever (3) (Fig. 7) is pulled over. This causes the spring (z) to be compressed, while the spring (y) is partly released.

The spring (z) will therefore try to disconnect the shiftable coupling clutch (q) from the main shaft (i) and to shift said coupling clutch in the other direction, in order to bring it in operative coupling position with the driving pinion (u) of the super speed gear.

The respective coupling parts of the coupling element (q) and of the driving pinion (u) will move alongside of each other until their respective rotational speeds are substantially equal.

When this occurs, the coupling is automatically effected.

When changing back from super speed gear to direct drive the above mentioned events take place in reversed order.

I claim:

1. A change speed gear set for automobiles comprising three aligned shafts constituting a driving shaft, a driven shaft and an intermediate shaft, clutches for connecting said shafts, a countershaft common to said three shafts, pairs of gears in constant mesh between said countershaft and two of said aligned shafts respectively, pairs of gears of differing ratios between said countershaft and the third shaft and means for selectively controlling said clutches and gears whereby to provide a direct drive through the aligned shafts, a direct drive solely through said first mentioned pairs of gears which are in constant mesh and drives through one of said first mentioned pairs and one of the latter mentioned pairs.

2. A change speed gear as defined in claim 1 including a shiftable double clutch which alternately and exclusively either connects two of said aligned shafts together or connects one of said shafts to the countershaft through one of said pairs of gears which are in constant mesh.

3. A change speed gear set for automobiles comprising three aligned shafts constituting a driving shaft, a driven shaft, a countershaft and an intermediate shaft, a gear connection between the driving shaft and the countershaft, a gear connection between the countershaft and the driven shaft, operable gear connections of different ratio between the countershaft and the intermediate shaft, and clutch means selectively operable to provide a direct drive through the aligned shafts, a drive through the countershaft direct therefrom to the driven shaft and drives through the countershaft to said intermediate shaft and thence direct to the driven shaft.

4. A change speed gear set for automobiles comprising three aligned shafts constituting a driving shaft, a driven shaft, a countershaft and an intermediate shaft, a gear connection between the driving shaft and the countershaft, a gear connection between the countershaft and the driven shaft, operable gear connections of different ratio between the countershaft and the intermediate shaft, and clutch means selectively operable to provide a direct drive through the aligned shafts, a drive through the countershaft direct therefrom to the driven shaft and drives through the countershaft to said intermediate shaft and thence direct to the driven shaft including a shiftable double clutch which alternatively and exclusively either connects the intermediate and driven shafts or the driven shaft to the countershaft through their gear connection.

5. A change speed gear as defined in claim 1 wherein the second mentioned drive is at increased speed relative to the first mentioned direct drive.

6. A change speed gear set with superspeed connection for automobiles comprising three aligned shafts constituting a driving shaft, a driven shaft and an intermediate shaft, a countershaft gear driven from said driving shaft, gears on the countershaft opposing the intermediate shaft, cooperating gears on the intermediate shaft and means for selectively controlling them to provide at will a direct drive between the driving shaft and the intermediate shaft or a drive at a plurality of speeds through said countershaft, a gear on the countershaft opposing the driven shaft, a cooperating gear loose on the driven shaft and means for alternatively clutching the driven shaft to the intermediate shaft and to said gear.

In testimony whereof I affix my signature.

MAX WAGNER.